United States Patent
Schultz et al.

(10) Patent No.: US 11,224,932 B2
(45) Date of Patent: Jan. 18, 2022

(54) RESISTANCE SPOT WELD HEAD WITH INTEGRATED ACCELEROMETER

(71) Applicant: Medtronic, Inc., Minneapolis, MN (US)

(72) Inventors: Steven J. Schultz, Brooklyn Park, MN (US); Nicholas A. Gronneberg-Schnoes, Roseville, MN (US); John E. Hartung, Inver Grove Heights, MN (US); Vadim A. Yakovlev, Brooklyn Park, MN (US); Peter Nikrin, Ramsey, MN (US); Scott N. Tuominen, Columbia Heights, MN (US); Enrico Westenberg, Eagan, MN (US); Jeffrey P. Weiss, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 555 days.

(21) Appl. No.: 15/951,889

(22) Filed: Apr. 12, 2018

(65) Prior Publication Data

US 2019/0314925 A1 Oct. 17, 2019

(51) Int. Cl.
*B23K 11/25* (2006.01)
*G01P 15/12* (2006.01)
*B23K 9/22* (2006.01)

(52) U.S. Cl.
CPC .......... *B23K 11/253* (2013.01); *G01P 15/122* (2013.01); *B23K 9/22* (2013.01)

(58) Field of Classification Search
CPC ...... B23K 11/255; B23K 31/125; B23K 9/22; Y10T 428/12347; G01P 15/122

USPC ...... 219/86.1, 91.1, 91.2, 110, 119; 428/594
See application file for complete search history.

(56) References Cited

U.S. PATENT DOCUMENTS

| 4,376,883 A | 3/1983 | Dao et al. |
| 4,472,620 A | 9/1984 | Nied |
| 4,596,917 A | 6/1986 | Nied et al. |
| 4,628,175 A | 12/1986 | Nissl |

(Continued)

FOREIGN PATENT DOCUMENTS

| DE | 4419071 C1 | 12/1995 |
| DE | 102007002319 A1 | 7/2008 |

(Continued)

OTHER PUBLICATIONS

International Search Report and Written Opinion of International Application No. PCT/US2019/026702, dated Jul. 12, 2019, 11 pp.

*Primary Examiner* — Tu B Hoang
*Assistant Examiner* — Vy T Nguyen
(74) *Attorney, Agent, or Firm* — Shumaker & Sieffert, P.A.

(57) ABSTRACT

Aspects of this disclosure relate to a welding system that is configured to execute opposed, step, and parallel gap resistance spot welds (RSW) and associated methods. The system may be configured to switch bases to switch between an opposed weld configuration, a step weld configuration, and a parallel gap configuration. The system may include an accelerometer that is secured to the weld head adjacent one of the electrodes. The system may use the accelerometer to determine whether or not an RSW was defective. Acceleration data may indicate a defective weld when it includes acceleration data that is outside of a threshold range of acceptable acceleration data.

28 Claims, 8 Drawing Sheets

(56) References Cited

U.S. PATENT DOCUMENTS

| | | | |
|---|---|---|---|
| 4,940,874 A * | 7/1990 | Ritter | B23K 11/008 |
| | | | 219/56 |
| 5,111,020 A | 5/1992 | Steiebel | |
| 6,337,458 B1 * | 1/2002 | Lepeltier | B23K 11/253 |
| | | | 219/117 |
| 6,506,997 B2 | 1/2003 | Matsuyama | |
| 6,515,251 B1 * | 2/2003 | Wind | B23K 11/255 |
| | | | 219/86.1 |
| 8,426,761 B2 | 4/2013 | Takahashi et al. | |
| 8,886,359 B2 | 11/2014 | Inaba et al. | |
| 2005/0150874 A1 | 7/2005 | Cabanaw et al. | |
| 2015/0298234 A1 | 10/2015 | Yakovlev et al. | |
| 2016/0144449 A1 | 5/2016 | Matsushita et al. | |
| 2016/0228974 A1 * | 8/2016 | Lam | H01M 50/502 |

FOREIGN PATENT DOCUMENTS

| | | |
|---|---|---|
| DE | 102010048961 A1 | 8/2011 |
| DE | 102011118419 A1 | 5/2013 |

* cited by examiner

RESISTANCE SPOT WELD HEAD WITH INTEGRATED ACCELEROMETER

TECHNICAL FIELD

The disclosure relates to resistance spot weld heads that are configured for both opposed and parallel gap resistance spot welding.

BACKGROUND

Resistance spot welding is a welding technique that includes joining metal surfaces together through the heat generated from electrical resistance as a result of running current through the two surfaces. Current may be routed to the metal surfaces through a first electrode and routed away from the metal surfaces through a second electrode. In some examples, two electrodes may execute a resistance spot weld (RSW) in an opposed weld configuration, where the two electrodes are substantially aligned on a single axis and approach each other (or one moving electrode approaches another relatively stationary electrode) to execute the weld to surfaces between the two electrodes. In other examples, two electrodes may execute a RSW in a parallel gap configuration where the two electrodes simultaneously approach and contact one or more components that define the metal surfaces along different adjacent parallel axes to execute the weld. In other examples, two electrodes may execute a RSW in a step weld configuration where the two electrodes simultaneously approach and contact one or more components that define the metal surfaces along different adjacent parallel axes to execute the weld, where one electrode contacts the one or more components at a relatively greater depth than the other electrode.

SUMMARY

Aspects of the disclosure are directed to a weld head configured to execute resistance spot welding (RSW). The weld head may be configured to execute opposed RSW (hereinafter referred to as opposed welds or opposed welding), parallel gap RSW (hereinafter referred to as PGW), and/or step RSW (hereinafter referred to as step welds or step welding). The weld head may include two arms that each are configured to receive an electrode configured for executing RSW. The two electrodes of the two arms may be used to execute PGW and/or step welds to components secured to a first base, while an electrode embedded in a second base may be used along with one of the electrodes of the weld head to execute an opposed weld. The weld head may include at least one accelerometer secured adjacent one of the electrodes. The accelerometer may be configured to gather accelerometer data of the electrode(s) as the electrode (s) execute a RSW. A computing device may be configured to analyze the accelerometer data and determine if the RSW resulted in a welding defect. The computing device may be configured to determine that the accelerometer data indicates a defect when the accelerometer data includes data points out of a threshold range of acceptable accelerometer values. For example, the computing device may be configured to determine that the acceleration data indicates a welding defect if one or more acceleration values satisfy a threshold, e.g., are either greater than a maximum threshold or lower than a minimum threshold, during a predetermined time window of the RSW during which the respective acceleration values occurred.

Aspects of the disclosure relate to an apparatus that includes a resistance spot weld (RSW) head that defines a PGW configuration and an opposed welding configuration. The RSW head includes one or more processing circuits, a first electrode, and a second electrode. The first electrode and the second electrode are configured to execute a parallel gap RSW (hereinafter referred to as a PGW) on a first component secured to a first base when the RSW head is in the PGW configuration. The first electrode is configured to execute an opposed weld with a third electrode of a second base on a second component secured to the second base when the RSW head is in the opposed welding configuration. The RSW head includes an accelerometer securely attached to the first electrode at a location adjacent to the first electrode. The one or more processing circuits are configured to cause the accelerometer to gather a PGW set of acceleration data of the first electrode during the PGW and gather an opposed weld set of acceleration data of the first electrode during the opposed weld. In some examples, during the PGW, the RSW head may include a second accelerometer securely mounted to the second electrode that may collect a third set of acceleration data during the PGW. The one or more processing circuits are configured to determine that the PGW set of acceleration data gathered during the PGW when the RSW head is in the PGW configuration indicates a first welding defect by including at least one acceleration value outside of a threshold acceleration range. The one or more processing circuits are configured to determine that the opposed weld set of acceleration data gathered during the opposed weld when the RSW head is in the opposed welding configuration indicates a second welding defect by including at least one acceleration value outside of the threshold acceleration range.

Other aspects of the disclosure relate to a welding system that includes a computing device with one or more processing circuits and a display. The welding system also includes a resistance spot weld (RSW) head that defines a PGW configuration and an opposed welding configuration. The RSW head includes a first arm that is configured to receive a first electrode, a second arm that is configured to receive a second electrode, and an accelerometer securely mounted to the first electrode at a location adjacent to the first electrode. The welding system also includes a first base with a first securing platform configured to secure a first component and a second base with a second securing platform configured to secure a second component and including a third electrode for the opposed weld. In some examples, during the PGW, the RSW head may include a second accelerometer securely mounted to the second electrode that may collect a third set of acceleration data during the PGW. The first electrode and the second electrode are configured to execute a PGW on the first component as secured to the first base when the RSW head is in the PGW configuration. The first electrode and the third electrode are configured to execute an opposed weld on the second component as secured to the second base when the RSW head is in the opposed welding configuration. The one or more processing circuits are configured to cause the accelerometer to gather a PGW set of acceleration data of the first electrode during the PGW and gather an opposed weld set of acceleration data of the first electrode during the opposed weld. The one or more processing circuits are configured to indicate a first welding defect of the first component on the display based on a determination that a first portion of the PGW set of acceleration data indicates the first welding defect by including at least one acceleration value outside of a threshold acceleration range. The first portion includes relatively less volatility of acceleration data than a subsequent second portion of the PGW set of acceleration data. The one or more processing circuits are configured to indicate a second welding defect of the second component on the display based on the determination that a first portion of the opposed weld set of acceleration data indicates the second welding defect by including at least one acceleration value outside of the threshold acceleration range. The first portion of the opposed weld set of acceleration data includes relatively less volatility of acceleration data than a subsequent second portion of the opposed weld set of acceleration data.

Other aspects of the disclosure relate to a method of welding that includes executing a PGW to a first component secured to a first base with a welding system. The welding system includes one or more processing circuits, a weld head, and a first and second electrode secured to the weld head. The welding system may execute the PGW by providing current to the first electrode when the electrodes are contacting the first component, such that the current may flow through the first component and exit out of the second electrode. The method of welding also includes gathering a PGW set of acceleration data by an accelerometer secured to the weld head. The PGW set of acceleration data may be data of the first electrode during the period of time during which the first electrode provided current to the first component. The method of welding also includes determining, by the one or more processing circuits, that the PGW set of acceleration data indicates a first welding defect by identifying that the PGW set of acceleration data includes at least one acceleration value outside of a first threshold acceleration range. The method of welding also includes executing, with the welding system, an opposed weld to a second component secured to a second base that includes a third electrode, the opposed weld executed by providing current to the first electrode when the first and third electrodes are contacting the second component, such that the current may flow through the first component and exit out of the third electrode. The method also includes gathering, by the accelerometer, an opposed weld set of acceleration data of the first electrode during the period of time during which the first electrode provided current to the second component. The method also includes determining, by the one or more processing circuits, that the opposed weld set of acceleration data indicates a second welding defect by identifying that the opposed weld set of acceleration data includes at least one acceleration value outside of a second threshold acceleration range

DETAILED DESCRIPTION

Figure 1:
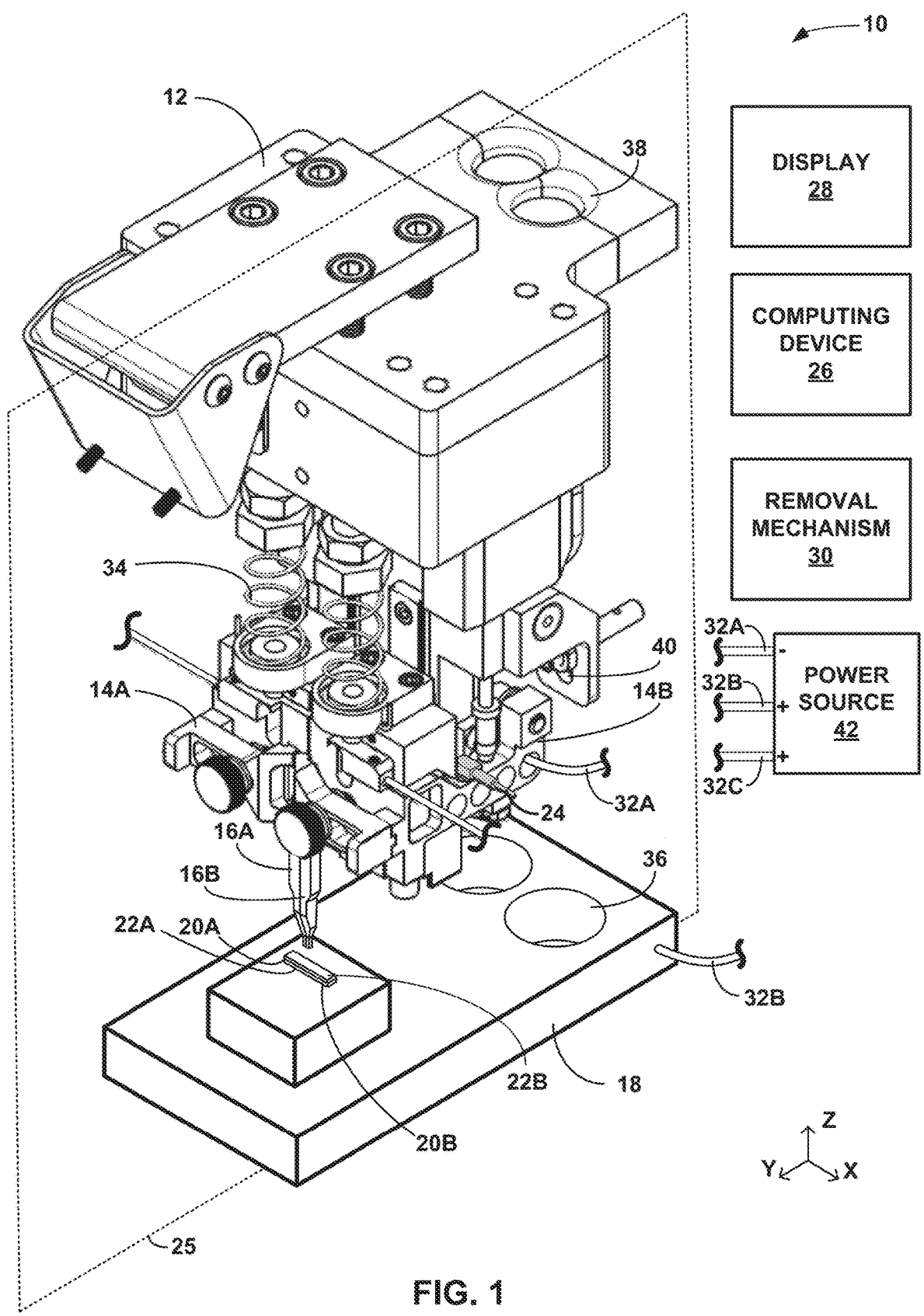
FIG. 1 is a conceptual and schematic diagram illustrating an example system that includes an example weld head with two weld arms that each have received a resistance spot weld (RSW) electrode, an example base, an example computing device, an example display, and an example removal mechanism.

Aspects of the disclosure are directed to a weld head configured to execute opposed and parallel gap resistance spot welding (RSW). The weld head may include two arms that each are configured to receive an electrode configured for executing RSW. The two electrodes of the two arms may be used to execute either parallel gap RSW (hereinafter referred to as PGW) to one or more components secured to a first base or step RSW (hereinafter referred to as a step weld) to one or more components that define contact points at two different depths as secured to the first base, while an electrode embedded in a second base may be used along with one of the electrodes of the weld head to execute an opposed RSW (hereinafter referred to as opposed welding or an opposed weld) to one or more components secured to the second base. The weld head may include at least one accelerometer secured adjacent one of the electrodes. The accelerometer may be configured to gather accelerometer data of the electrode as the electrode is executing a RSW. One or more processing circuits that are integrated into the weld head and/or integrated into a separate computing device may be configured to analyze the accelerometer data and determine if the RSW resulted in a welding defect. The processing circuits may be configured to determine that the accelerometer data indicates a defect when the accelerometer data includes data points satisfying one or more criteria, such as being out of a range threshold. For example, the processing circuits may be configured to determine that the acceleration data indicates a welding defect if one or more acceleration values are either greater than a maximum threshold or lower than a minimum threshold during a predetermined time window of the RSW during which the respective acceleration values occurred.

For example, when executing a PGW or step weld, the weld head may provide current to an electrode of one of the arms, such both electrodes may press down upon and weld together two metal surfaces resting upon a first base when the current flows through the surface to the other electrode. For another example, when executing an opposed weld, the current may be provided to either the electrode of one of the two arms that is executing the opposed weld or current may be provided to an electrode embedded of a second base, such that the current may pass from one of these two electrodes through two metal surfaces resting upon the second base and into the other respective electrode to weld the two surfaces together. A welding system may switch between executing PGW, step welding, and opposed welding by merely swapping out which base is secured to the welding station (e.g., a base without an electrode for PGW and/or step welds or a base with an electrode for opposed welding), swapping out an electrode secured to an arm (e.g., securing a relatively longer electrode that can extend to a relatively lower depth during the weld), and/or resecuring an arm to a different location on the weld head (e.g., a lower relative location to enable the same electrode to extend to a relatively lower depth during the weld) depending upon the application. Configuring a welding system to alternate between PGW, step welding, and opposed welding by only switching and/or resecuring a single component (e.g., the base, the electrode, or the arm location) may increase a speed at which the welding system may sequentially alternate between the configurations. Increasing a speed with which an operator may reconfigure a welding system to execute PGW, step welds, and/or opposed welds may enable the welding station to accommodate all three (or more) processes during production, reducing a need for additional stations to provide the alternative processes.

The two arms may each define an aperture configured to receive a securing mechanism such as a bolt. A securing mechanism may be inserted through one of the apertures of a respective arm and also inserted into an aperture of the weld head to secure the respective arm to the weld head. In some examples, each arm may define a plurality of apertures, such that the securing mechanism may be inserted through a different aperture of the arm to secure the respective electrode at a different location relative to the weld head. In this way, electrodes may be moved to different locations relative to the weld head in order to execute RSWs at different locations for different metal surfaces by securing respective arms to the weld head using different apertures. Similarly, as a result of securing mechanisms being receivable by a plurality of apertures at predetermined locations, a weld head may be configured to quickly be configured to execute a plurality of PGWs and/or step welds with different corresponding gaps between the electrodes (e.g., where a predetermined gap distance correlates to predetermined apertures).

FIG. 1 is a conceptual and schematic diagram of welding system 10 that includes weld head 12 configured to execute RSWs. FIG. 1 includes XYZ axes that are referenced herein for purposes of clarity, though weld systems 10 may have different orientations in different examples. Weld head 12 may include one or more arms 14A, 14B (collectively, "arms 14") that each are configured to receive at least one electrode 16A, 16B (collectively, "electrodes 16") that execute RSWs. As received by arms 14, one or both electrodes 16 may be configured to execute a PGW, step weld, and an opposed weld as discussed herein.

Electrodes 16 may be many conductive elements, such as, e.g., class 2 copper, class 1 copper, or silica loaded copper. Electrodes may be any size consistent with the disclosure herein. For example, electrodes 16 may define a 3.175 millimeter×3.175 millimeter cross section at a "top" portion (e.g., where electrodes 16 are secured to arms 14) and a 1.015 millimeter×0.635 millimeter cross-section at a "bottom" portion (e.g., where electrodes 16 contact components 20 as discussed herein). In some examples, electrodes 16 may define different cross-sectional shapes, such as circular, ovaloid, triangular, or the like.

Base 18 and weld head 12 may both be secured to a common location at a welding station. In some examples, weld head 12 may move towards base 18 to execute a PGW, step weld, and/or an opposed weld. For example, weld head 12 may be secured to a moving stage that can be lowered or otherwise moved along the Z axis toward a relatively stationary base 18. Arms 14 may be configured to be moveable relative to weld head 12 when executing a PGW, step weld, and/or an opposed weld. For example, one or both electrodes 16 may be secured to weld head 12 partially through spring 34 that is configured to longitudinally condense along the Z axis when electrodes 16 contact components 22A, 22B (collectively, components "22") that are secured to base 18.

Upon contacting components 22, spring 34 may cause electrodes 16 to provide a physical force upon components 22. Locknuts of welding system 10 can be adjusted to modify this physical force as described herein. One or more components of welding system 10 (e.g., such as a displacement sensor) may identify and capture a displacement reading that is equal to the amount that arms 14 and electrodes 16 move relative to weld head 12. Control software (as stored within and executed upon computing device 26) may monitor this physical force and displacement to determine when the linear stage should stop (e.g., when the physical force and/or displacement satisfy a threshold level. Once the control software identifies that the linear stage should stop, power source 42 fires current through one electrode 16 that passes through the components 22 and passes back to power source to execute the PGW, step weld, or opposed weld. At this point weld head 12 is retracted up Z-axis away from components 22 enabling spring 34 to stretch to a normal "resting" state and therein move arms 14 and electrodes 16 back to a "starting" state.

In other examples, arms 14 may be configured to move relative to weld head 12 to and base 18 to execute a PGW, step weld, and/or an opposed weld. For example, arms 14 may move along the Z axis away from weld head 12 to execute a PGW, step weld, or opposed weld. Weld head 12 may include one or more motors and/or drivers to move arms 14. Arms 14 may move along Z axis toward base 18 upon which components 22A, 22B (collectively, components "22") are secured to execute the PGW, step weld, or opposed weld.

Both base 18 and weld head 12 may be secured to a single welding station on an assembly line. Base 18 may be secured to a common location through one or more bores 36 of base 18 while weld head 12 is secured to the common location through one or more bores 38. For example, base 18 may be fixedly secured to a first shelf through a first set of securing mechanisms that are inserted into bores 36 while weld head 12 is fixedly secured to a second shelf with securing mechanisms inserted through at least a first bore 38 (e.g., securing mechanisms such as a bolt or pin). In other examples base 18 may be secured to common location through other means, such as using a clamp or the like the mechanically secure base 18 to a location adjacent weld head 12. In certain examples, base 18 may be directly secured to weld head 12 (not depicted).

Figure 3A:
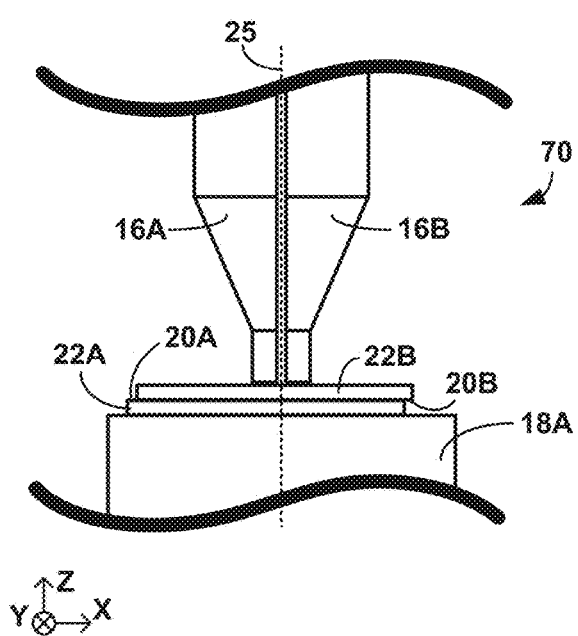
FIG. 3A is a conceptual and schematic diagram illustrating the weld head of FIG. 1 executing a parallel gap RSW (hereinafter referred to as PGW) to components on an example first base.

Base 18 may be one of a plurality of bases that are used in conjunction with weld head 12, such that different examples of base 18 may be unsecured and interchanged for alternative applications as described herein. For example, one version of base 18 (e.g., base 18A as depicted in FIG. 3A) may be configured for PGW, while another base 18 is configured is configured for step welding, while another of base 18 (e.g., base 18B as depicted in FIG. 3C) may be configured for opposed welding. In some examples, a same base (e.g., base 18A) may be used for both PGW and step welding, such that an operator may not need to switch base 18 between a PGW and a step weld (e.g., an operator may instead switch out an electrode 16 or reposition one arm 14 using the apertures as discussed herein). In some examples, an operator may only need to swap out a base (e.g., 18A or 18B) that is coupled to welding system 10 to switch between opposed weld and PGW/stepped weld functionality.

Electrodes 16 may execute a RSW weld of surfaces 20A, 20B (collectively, "surfaces 20") of components 22A, 22B (collectively, "components 22") secured upon base 18. Components 22 may include medical devices. For example, two medical devices components 22 may be stacked on each other as secured to base 18 such that respective surfaces 20 of the components 22 are substantially coplanar as they contact each other (e.g., such that the two surfaces 20A, 20B are substantially flush with each other once components 22 are secured to base 18). The surfaces 20 may be planar with an XY plane as secured to base 18.

While components 22 are depicted as having a visible height (e.g., as measured along Z axis) herein for purposes of clarity, components 22 may define a relatively small height that may not be visible to the naked eye. For example, components 22 may define a height between 0.5 and 1.3 millimeters, though components 22 may be other sizes in other examples. When components 22 are secured to or otherwise resting on base 18, one or both electrodes 16 may be lowered toward surfaces 20 of components 22 as weld head 12 is lowered toward base 18. Though two components 22 that each define respective surfaces 20 are depicted in FIG. 1 for purposes of clarity, in other examples electrodes 16 may be used to weld together two surfaces 20 of a single component, or execute a weld on a single surface of a single component, or weld together more than two surfaces 20 of more than two components 22.

Weld head 12 may include accelerometer 24. Accelerometer 24 may be configured to gather acceleration data of at least one of electrodes 16 as electrodes 16 move during the execution of the PGW, step weld, or opposed weld. For example, accelerometer 24 may be configured to gather acceleration data while current is provided to one electrode of welding system 10 that flows throw both surfaces 20 to exit out another electrode of welding system 10. Accelerometer 24 may gather motion of one or both electrodes 16 relative to weld head 12, such motion being possible at least partially as a result of electrodes 16 being moveably attached to weld head 12 using springs 34 and slides (e.g., slide 130 of FIG. 6) as discussed herein. Accelerometer 24 may be configured to be fixedly secured to weld head 12 at a position adjacent to electrode 16, such that substantially each movement of electrode 16 along the Z axis may be substantially matched or otherwise measured by accelerometer 24. For example, as depicted in FIG. 1, both accelerometer 24 and electrode 16B may be secured to arm 14B of weld head 12, such that both accelerometer 24 and electrode 16B move in conjunction as electrodes 16 executes RSWs as described herein.

Accelerometer 24 may be configured to transmit acceleration data to computing device 26 of welding system 10. Computing device 26 may include one or more processing circuits that are configured to use acceleration data from accelerometer 24 to determine if a weld executed by electrodes 16 was defective. In some examples, computing device 26 may further control and/or cause weld head 12 to execute PGW, step weld, and/or opposed welding. For example, computing device 26 may cause current to be routed to one of electrodes 16 to execute an RSW, and/or computing device 26 may cause arms 14 to approach surfaces 20 in order to execute an RSW. Though in FIG. 1 computing device 26 is depicted as a discrete component in comparison to weld head 12, in other examples one or more aspects of computing device 26 may be integrated into weld head 12.

Where computing device 26 is physically separate from weld head 12 as depicted, accelerometer 24 may be directly coupled to computing device 26. In other examples, accelerometer 24 may transmit data over a computing network, such as a private local area network (LAN) or wide area network (WAN), or a public network such as the internet. Once received, computing device 26 may be configured to determine if the acceleration data indicates a welding defect. For example, computing device 26 may determine if that acceleration data as gathered by accelerometer 24 indicates a welding defect if the acceleration data includes one or more acceleration data points that are outside of a predetermined threshold data range.

The acceleration data as gathered by accelerometer 24 and received by computing device 26 may include a plurality of acceleration data points. Accelerometer 24 may include a ceramic sensing element with a sensitivity of around 0.5 millivolts/(meter/second$^2$), ±20%, a measurement range of (±9810 meters/second$^2$ peak, and a sampling rate of around 20,000 per/second.

Acceleration data points may include negative (e.g., in a first direction along the Z axis) and/or positive (e.g., in a second and opposite direction along the Z axis) values. Acceleration data points are discussed and depicted herein are in meters/second$^2$ (m/s$^2$), though acceleration data may be recorded, received, or manipulated in any unit. Acceleration data points may be associated with a time during the weld at which the acceleration data was recorded. For example, a weld may take 0.007 seconds to execute, and accelerometer 24 may record a plurality of acceleration data points that occur during the 0.007 seconds, where each recorded acceleration data point is identified and stored as associated with the relative time (e.g., a time between 0.000 seconds and 0.007 seconds) during the weld at which point the acceleration data was recorded.

In some examples, the predetermined threshold data range as stored and/or accessed by computing device 26 may include different acceleration data ranges for one or more different time spans of an RSW. Put differently, a threshold data range for a given RSW may contain a plurality of upper and lower threshold values that correspond to different time periods of a weld such that the "envelope" of acceptable acceleration values may grow or shrink or encompass a different range of values at different points during a RSW. As the upper threshold increases and/or the lower threshold decreases, the number or range of acceptable acceleration values (e.g., values that are between the upper threshold and lower threshold) may increase, and similarly as the upper threshold decreases and/or the lower threshold increases the number or range of acceptable acceleration values may decrease. In this way, an acceleration data point that may be within the respective threshold range for the point in time during which the acceleration data point was gathered may be outside of (e.g., greater than upper threshold or lower than the lower threshold) the range for the other times of the weld.

Computing device 26 may send results to display 28 of welding system 10. Computing device 26 may cause display 28 to provide a visual alert relating to detected welding defects. For example, computing device 26 may cause display 28 to present a red light that indicates the welding defect, or present the text "WARNING IMD WELD 25813 FAILURE" or the like. Alternatively, or additionally, computing device 26 may maintain a record of detected welding defects for future use. For example, computing device 26 may compile a list of components 22 as potentially defective as computing device 26 analyzes data from accelerometer 24 and/or other sensors, subsequently providing a report on this complete list of components 22 (e.g., for an entire run of a plurality of components 22). Computing device 26 may cause display 28 to provide the visual alert for the benefit of a human operator that may further inspect or otherwise actively fix or discard the device that underwent the potentially defective weld. Computing device 26 may additional cause display 28 to display a positive indication if no defect was detected from the acceleration data.

In some examples, computing device 26 may cause removal mechanism 30 of welding system 10 to remove components 22 of surfaces 20 that underwent the potentially defective weld from base 18. Removal mechanism 30 may include a mechanical arm or the like that grasps, sweeps, or otherwise removes components 22 from base 18. Removal mechanism 30 may remove components 22 from an assembly line that includes welding system 10 to a separate location. For example, removal mechanism 30 may deposit components 22 in a discrete location designated for defective components, or components that otherwise require further inspection.

Welding system 10 may include power source 42. Power source 42 may be configured to provide current to one of electrodes 16 to execute PGW, step welds, and opposed welds as discussed herein. Power source 42 may be coupled to one or more leads 32A-32C (collectively "leads 32"). For example, power source 42 may be coupled to lead 32A that is configured to provide current to electrodes of welding system 10 and power source 42 may be coupled to leads 32B, 32C that are configured to return current to power source 42 to complete a circuit. In this example, lead 32A may be coupled to electrode 16B that is used in each of PGWs, step welds, and opposed welds, while lead 32B is configured to be coupled to an electrode secured within base 18 (e.g., electrode 74 of FIG. 3C) that is configured to return current to power source 42 during opposed welds, while lead 32C is configured to be coupled to electrode 16A that is configured to return current to power source 42 during PGWs and/or step welds.

Weld head 12 may be substantially mirrored across central plane 18 of weld head 12. For example, both arms 14 may be substantially mirrored across central plane 18 as secured to weld head 12. Electrodes 16 may be on either side of central plane 25.

In some examples, welding system 10 may include additional sensors with accelerometer 24. For example, computing device 26 may detect and indicate a defective weld if any of a number of sensors of welding system 10 detects a failure. In other examples, computing device 26 may only detect and indicate a defective weld if two or more sensors (e.g., including accelerometer 24) affirmatively identify a defective weld. For example, welding system may include a current sensor that detects a current running through electrodes 16, a voltage sensor that detects voltage level across electrodes, a resistance sensor that detects resistance levels of electrodes, or a displacement sensor that detects displacement of electrodes 16.

Figure 2:
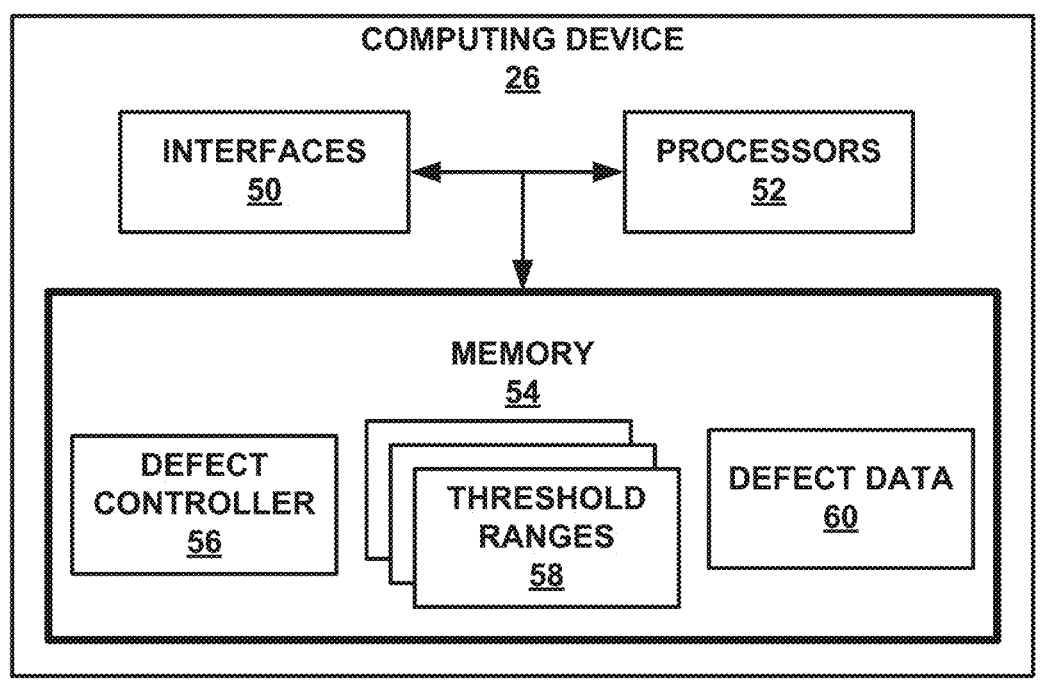
FIG. 2 is a functional block diagram of the computing device of FIG. 1.

FIG. 2 is a functional block diagram illustrating components of computing device 26 of FIG. 1. Computing device 26 includes interfaces 50, processing circuits 52, and memory 54. Computing device 26 may include any number of interfaces 50, processing circuits 52, and memory 54 components. Interfaces 50 may enable computing device 26 to communicate with one or more external components, such as weld head 12, accelerometer 24, display 28, and/or removal mechanism 30. Though weld head 12, accelerometer 24, computing device 26, display 28, and removal mechanism 30 are all depicted in FIG. 1 as separate and discrete components, in some examples one or more of weld head 12, accelerometer, display 26, and/or removal mechanism 30 may be directly coupled to or incorporated within computing device 26 and accessed using interfaces 50. Interfaces 50 may include one or more network interface cards, such as Ethernet cards, and/or any other types of interface devices that can send and receive information. Any suitable number of interfaces 50 may be used to perform the described functions according to particular needs.

Computing device 26 may include one or more processing circuits 52 configured to implement functionality and/or process instructions as described herein. For example, processing circuits 52 may be configured to execute instructions as stored in memory 54. Processing circuits 52 may include, for example, microprocessors, digital signal processors (DSPs), application specific integrated circuits (ASICs), field-programmable gate arrays (FPGAs), and/or equivalent discrete or integrated logic circuitry. Though in FIG. 2 processing circuits 52 are depicted as separate from memory 54, in other examples one or more elements or portions of memory 54 may include one or more processing circuits 52, or instructions stored in memory 54 as described herein may be hard-coded into one or more processing circuits 52 (e.g., such that no instructions of identifying weld defects as described herein are stored within memory 54 of computing device 26).

Computing device 26 may include memory 54 configured to store information within computing device 26. Memory 54 may include a computer-readable storage medium or computer-readable storage device. In some examples, memory 54 may include one or more of a short-term memory or a long-term memory. Memory 54 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, memory 54 may store logic (e.g., logic of identifying weld defects using acceleration data as discussed herein) for execution by one or more processing circuits 52. In further examples, memory 54 may be used by computing device 26 to temporarily or pseudo-permanently store information during program execution. For example, computing device 26 may store one or more threshold ranges 58 and/or defect data 60 in memory 54. In other examples computing device 26 may store more or less data in memory 54, or may store the same data in a different structure or organization.

Memory 54 may include defect controller 56. Defect controller 56 may include instructions to be executed by one or more processing circuits 52 of computing device 26 to perform the functions of computing device 26 as described herein. For example, as described herein, defect controller 56 may be configured to identify weld defects using acceleration data as gathered by accelerometer 24. Defect controller 56 may receive acceleration data and determine whether or not the acceleration data is within threshold ranges 58. Defect controller 56 may determine a particular threshold range 58 that is applicable to the respective weld. For example, defect controller 56 may identify whether weld head 12 executed an RSW in opposed weld, step weld, or PGW configuration. Defect controller 56 may determine whether or not weld head 12 executed an RSW in opposed weld, step weld, or PGW configuration by detecting where current flows during an RSW weld (e.g., from electrode 16 of weld head 12 to an electrode of base 18 or from one electrode 16A of weld head 12 to another electrode 16B of weld head 12). Further, defect controller 56 may identify and utilize different threshold ranges 58 based on a set of apertures used to secure arms 14 to weld head 12 and/or a detected type of electrode 16 secured to weld head 12 as described herein. In other examples defect controller 56 may use other variables or factors to identify and utilize one or more threshold ranges 58 as stored in memory 54.

Figure 3B:
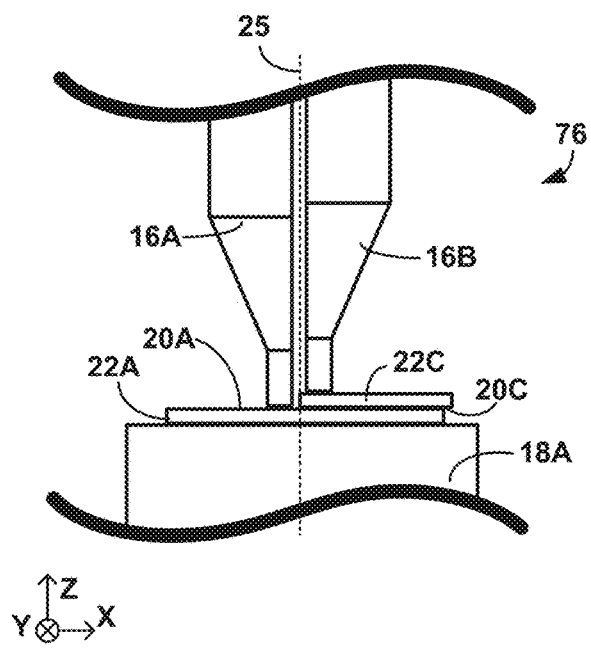
FIG. 3B is a conceptual and schematic diagram illustrating the weld head of FIG. 1 executing a step RSW (hereinafter referred to as a step weld) to components on the first base of FIG. 3A.
Figure 3C:
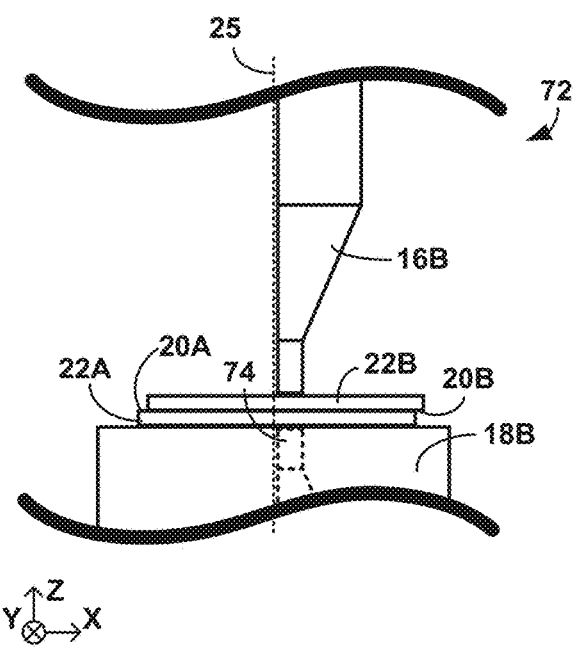
FIG. 3C. is a conceptual and schematic diagram illustrating the weld head of FIG. 1 executing an opposed RSW (hereinafter referred to as an opposed weld or opposed welding) to components on an example second base.

For example, FIGS. 3A-3C depict conceptual and schematic diagram of PGW configuration 70, step configuration 76, and opposed weld configuration 72, respectively. As depicted in FIG. 3A, PGW configuration 70 may include both electrodes 16A, 16B contacting component 22B as stacked on component 22A as secured to first base 18A. Surfaces 20 of components 22 to be welded may be facing and contacting each other as stacked on base 18A. While components 22 are depicted as offset as stacked on base 18 for purposes of depicting both surfaces 20, it is to be understood that components 22 may be substantially aligned in other examples. As depicted, electrodes 16 may be on either side of central plane 25. For example, locations of both electrodes 16 may define a small distance along X axis between itself and central plane 25, therein defining a distance between both electrodes 16 along X axis.

As discussed above, welding system 10 may include a first lead 32A coupled to electrode 16B and a second lead 32C coupled to electrode 16A. Both leads 32A, 32C may be coupled to power source 42. In this way, when you "fire" the welding power source 42, current may flow in the form of electrons from first lead 32A to electrode 16B to both components 22 to weld both surfaces 20 together, upon which electrons/current may exit components 22 through electrode 16A to return to power source 42 via second lead 32C.

Alternatively, as depicted in FIG. 3B, step weld configuration 76 may include one electrode 16A contacting component 22A and another electrode 16B contacting a second component 22C that is stacked on component 22A. In some examples, as depicted, second component 22C may be relatively smaller than component 22A, such that electrode 16A extends past second component 22C along Z axis to contact component 22A while electrode 16B contacts second component 22C. In other examples (not depicted), second component 22C may be a substantially similar size as component 22A but may simply be stacked offset such that electrode 16A extends further along Z axis than electrode 16B. Arm 14A securing electrode 16A may be configured to extend further along Z axis than arm 14B securing electrode 16B to move into step weld configuration 76. For example, one or more lock nuts (e.g., lock nuts 134 of FIG. 6), spring 34, and/or motors or drivers configured to move arms 14 may be configured to move arm 14A relatively further along Z axis than 14B. Alternatively, electrode 16A may be relatively longer than electrode 16B (e.g., as depicted between electrodes 16-1, 16-2, 16-3 of FIG. 5), such that arms 14 may both be configured to move a similar distance along Z-axis to result in electrode 16A reaching further along Z axis relative to electrode 16B.

Both component 22A and component 22C may be secured to first base 18A. Surfaces 20A, 20C of components 22A, 22C to be welded may be facing and contacting each other as stacked on base 18A. While components 22A, 22C are depicted as offset on a right side as stacked on base 18A for purposes of depicting surface 20C, it is to be understood that components 22 may be substantially aligned such that an end of smaller component 22C is aligned with an end of relatively larger component 22A in other examples. As depicted, electrodes 16 may be on either side of central plane 25. For example, locations of both electrodes 16 may define a small distance along X axis between itself and central plane 25, therein defining a distance between both electrodes 16 along X axis.

As discussed above, welding system 10 may include a first lead 32A coupled to electrode 16B and a second lead 32C coupled to electrode 16A. Both leads 32A, 32C may be coupled to power source 42. In this way, when welding power source 42 is fired, current may flow in the form of electrons from first lead 32A to electrode 16B to component 22C through surfaces 20C and 20A to weld both surfaces 20A, 20C together, upon which electrons/current may exit component 22A through electrode 16A to return to power source 42 via second lead 32C.

Alternatively, as depicted in FIG. 3C, opposed weld configuration 72 may include electrode 16B and electrode 74 that is secured to second base 18B. Second base 18B may be different than first base 18A in that second base 18B includes electrode 74. Though electrode 74 is depicted as structurally similar to electrodes 16 for purposes of illustration, electrode 74 may be a different shape in other examples. For example, electrode 74 may be substantially larger than electrodes 16, such that electrode 74 defines a cross-sectional shape that is 25 millimeters by 50 millimeters or larger. As secured to welding system 10, electrode 74 may be aligned along Z axis with electrode 16B. In some examples, in opposed weld configuration 72 component 22B may be stacked on component 22A as secured to first base 18A directly over electrode 74 and directly under electrode 16B. Surfaces 20 of components 22 to be welded may be facing and contacting each other as stacked on base 18A and between electrode 16B and electrode 74.

In some examples, electrode 74 may be external to base 18B, such that at least a tip of electrode 74 that is configured to contact components 22 is visible. In other examples, electrode 74 may be partially or substantially entirely enclosed within base 18B, such that the tip of electrode 74 is substantially flush with an outer surface of base 18B to contact or otherwise receive current from components 22 (e.g., as provided to components 22 by electrode 16B). In some examples, as depicted, electrode 16A may be removed from weld head 12 in opposed weld configuration 72. In other examples, weld head 12 may be configured to only lower electrode 16B in opposed weld configuration 72, such that electrode 16A is raised higher along axis Z than electrode 16B. In yet other examples, both electrodes 16 may be lowered along Z axis to components 22, but current may only be provided to lead 32A and therein to one electrode 16B (e.g., the electrode that is aligned with electrode 74 of base 18B), and further current may only be allowed to return to power source 42 through lead 32B that is coupled with electrode 74 secured to base 18B. For example, lead 32B may be manually or automatically (e.g., as caused by computing device 26) decoupled from power source 42 and/or decoupled from electrode 16A.

Figure 4:
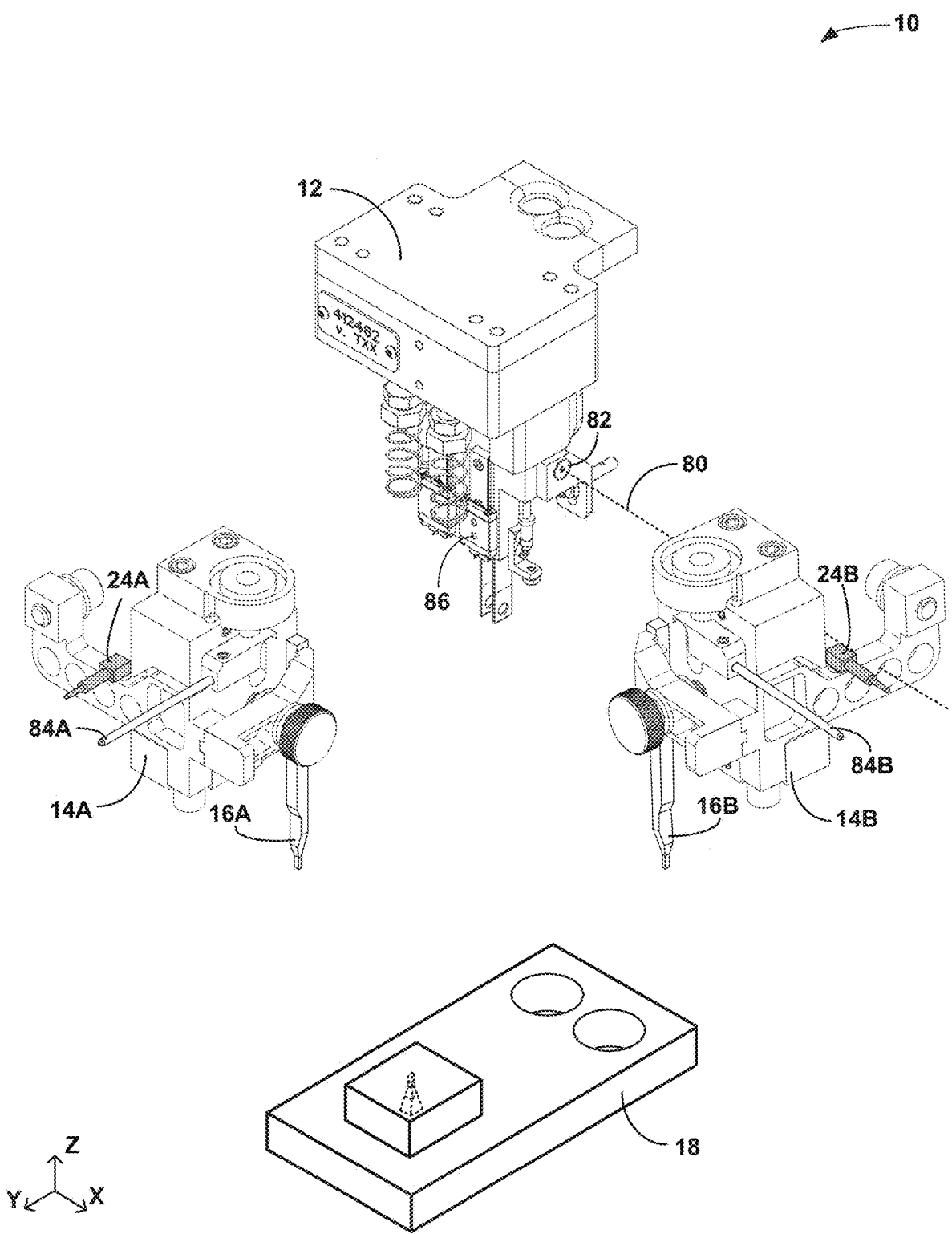
FIG. 4 is a conceptual view of the base of FIG. 1 and the weld head of FIG. 1 in a partially assembled state.

FIG. 4 depicts a conceptual and schematic diagram of weld head 12, arms 14, and base 18 in a partially assembled state. For example, as depicted, arm 14B is removed from weld head 12 along axis 80 that is aligned with X axis. As removed, input port 82 of arm 14B is depicted. Input port 82 may be configured to receive lead 32A, such that upon receiving lead 32 electrode 16B of arm 14B is electrically coupled to lead 32A and therein power source 42. Arm 14B may be re-secured to weld head 12 by moving arm 14B back along axis 82 and inserting a securing mechanism (e.g., a pin or bolt or the like) through an aperture of arm 14B and aperture 86 of weld head 12

Further, arm 14B is depicted as both removed from weld head 12 and rotated 90° on an XY plane relative to Z axis. As depicted, welding system 10 may include two accelerometers 24A, 24B. Both accelerometers 24A, 24B may be secured to respective arms 14A, 14B, such that accelerometers 24A, 24B may substantially move when electrodes 16A, 16B move. Put differently, accelerometers 24A, 24B may be configured to move along Z axis in conjunction with electrodes 16A, 16B when electrode 16B is providing current to components 22 to execute a RSW. In this way, welding system 10 may include two accelerometers 24A, 24B gathering acceleration data.

In some examples, computing device 26 may analyze accelerometer data as gathered from accelerometers 24A, 24B independently, such that each set of acceleration data is analyzed to see if the acceleration data indicates a welding defect. In such examples, welding system 10 may increase an opportunity for accelerometers 24A, 24B to gather evidence that indicates welding defect. In other examples, computing device 26 may average together acceleration data as gathered from both accelerometers 24A, 24B. Averaging together acceleration data across two or more accelerometers 24A, 24B may decrease a possibility of false negatives in indicating a weld was defective (e.g., where one accelerometer gathers acceleration data that incorrectly suggests that a weld was defective, while the other accelerometer gathers data that correctly indicates that a weld was acceptable).

FIG. 4. depicts feedback wires 84A, 84B (collectively, "feedback wires 84") extending from arms 14. As depicted, feedback wires 84 extend straight out such that both feedback wires 84 are substantially stiff, though feedback wires 84 may be relatively flexible to allow feedback wires 84 to be routed between components. Feedback wires 84 may be coupled to computing device 26 and/or other devices. Feedback wires 84 may provide weld data to computing device 26. For example, feedback wires 84 may provide voltage feedback information from weld head 12 to computing device 26. Voltage feedback may include information about the weld pulse delivered to components 22 when current is provided through one electrode 16 to weld components 22. In some examples, computing device 26 may gather acceleration data from one or both accelerometers 24A, 24B using feedback wires 84. Further, arms 14 and/or weld head 12 may send other sensor data using feedback wires 84. For example, displacement data, visual data, and the like may be sent over feedback wires 84 to computing device 26

Figure 5:
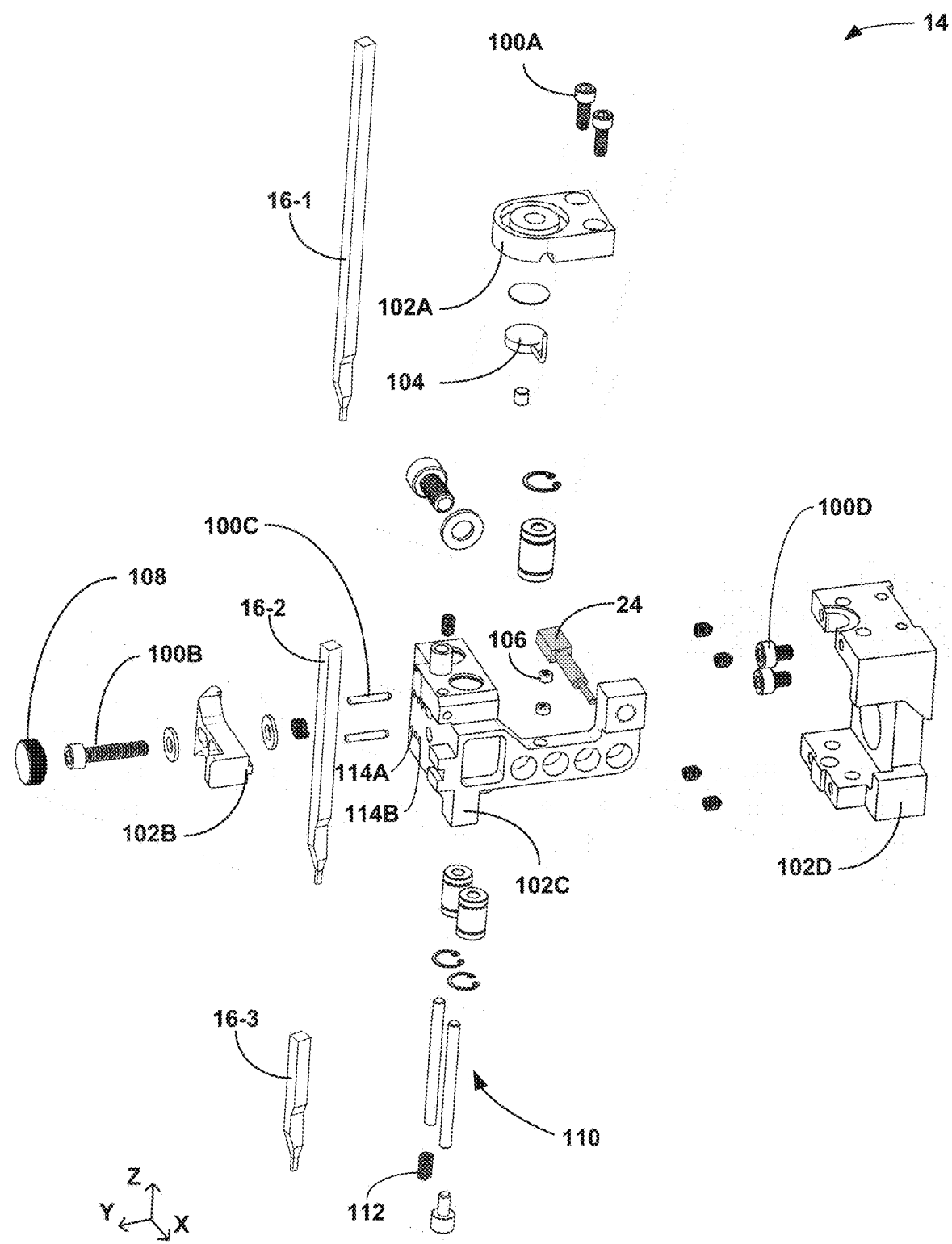
FIG. 5 is an exploded conceptual and schematic view of an arm of the weld head of FIG. 1.

FIG. 5. depicts an exploded conceptual and schematic diagram exploded view of weld arm 14. Weld arm 14 may include a plurality of securing mechanisms 100A-100D (collectively, "securing mechanism 100") configured to secure arm 14 together in an assembled state. For example, securing mechanisms 100 may include a variety of bolts, dowels, pins, or the like. Securing mechanisms 100 may be configured to removably or reversibly secure arm 14 into an assembled state, such that it may be possible to disassemble arm 14 by removing securing mechanisms 100 without damaging arm 14 or securing mechanisms 100.

Arm 14 may include a plurality of body components 102A-102D (collectively, body components 102"). Body components 102 may be cast, machined, or otherwise manufactured into their depicted shape. Body components 102 may be configured to be secured together to hold other components and/or define shapes that may be secured to weld head 12. For example, body components 102A, 102C may be secured together to hold load cell 104 that weld head 12 may use to collect weld data during RSWs as described herein.

For another example, body components 102B, 102C may be secured together to hold any of electrodes 16-1, 16-2, 16-3 in arm 14, each of which may both be substantially similar to electrodes 16 described herein. As depicted electrode 16-1 may be substantially longer along Z axis than electrode 16-2, which may be substantially longer along Z-axis than electrode 16-3. An operator may secure one of electrodes 16-1, 16-2, 16-3 to arm 14 and therein weld head 12 depending upon a specific welding application that welding system 10 is to be used for. Knob 108 may be used to remove securing mechanism 100B that is secured one of electrodes 16-1, 16-2, 16-3 within body compartments 102B, 102C. As such, when switching between different welding applications, an operator may be able to modify weld system by simply turning knob 108 to loosen securing mechanism 100B in order to functionally replace one electrode with another. Configuring weld system 10 such that electrode position along the Z-axis may be altered by switching electrodes with different lengths may increase a functionality of weld system 10 and decrease an amount of time required to alter functionality of weld system 10.

In some examples, accelerometer 24 may be secured to weld arm 14 through magnets 106. Magnets 106 may securely affix accelerometer 24 to weld arm 14 such that accelerometer may move along each axis in conjunction with electrode 16. In some examples, magnets 106 may secure accelerometer 24 to the same body component 102C that encloses electrode 16 to improve an ability of accelerometer 24 to track movement of electrode 16. Magnets 106 may have a sufficient strength that accelerometer 24 does not move relative to arm 14 as RSW is executed. Magnets 106 may further be weak enough that an operator may remove accelerometer 24 from arm 14 without damaging either accelerometer 24, arm 14, or magnets 106. Configuring weld arm 14 such that accelerometer 24 is securely affixed at arm 14 such that accelerometer 24 is both configured to move with electrode 16 but also be removable may increase an ability of accelerometer 24 to be replaced easily and quickly.

Arms 14 may be configured to be secured to weld head 12. Arms 14 may define a plurality of apertures 114A, 114B (collectively, "apertures 114") that may be used to secure arms 14 to weld head 12. For example, arms 14 may be secured to weld head 12 using one or more pins, bolts, dowels, or the like that are configured to extend through apertures 114 and be securely mechanically received by weld head 12. As depicted, securing members 100C are configured to be received by apertures 114 to secure arm 14 to weld head 12. Though arm 14A is depicted in FIG. 1 as defining all apertures 114 centered on one XZ plane, in other examples arms 14 may define apertures 114 at a plurality of different relative locations (e.g., different locations along Y axis). In some examples, different apertures 114 may be used to secure arms 14 to weld head 12 in different relative locations. For example, aperture 114A may be used to secure arm 14A to weld head 12 to define relatively more distance and/or space between arm 14A and arm 14B along X axis, while aperture 114B may be used to secure arm 14A to weld head 12 to define relatively less space between arm 14A and arm 14B along X axis. In this way, a subset (e.g., less than all) of apertures 114 are used to secure arms 14 at any one relative location to weld head 12.

In some examples, all apertures 114 relate to predetermined configurations. For example, weld head 12 may be used to execute RSWs for a finite number of predetermined devices, such that each of the different RSWs are to be executed at predetermined locations. In this example, each of apertures 114 may relate to one or more of these predetermined locations. In this way, arms 14 may be moved to different relative locations on weld head 12 by switching which of apertures 114 are used to secure arms 14 to weld head 12.

Arm 14 may include other components that improve an accuracy and robustness of weld system 10. For example, arm may include bushing and linear race set 110 that is configured to prevent twisting of weld head 12 load cells 104. Put differently, bushing and linear race set 110 may prevent side loading of load cells 104. Bushing and linear race set 110 may alternatively/additionally improve the force measurement during the welding process. As depicted in FIG. 5, one set of bushing and linear race set 110 may terminate in a hard stop used for reference in evaluating force measurements (e.g., to set up and check weld system 10 during an initialization protocol) and the other set of bushing and linear race set 110 terminates in spring 112 and measurement load cell 104.

Figure 6:
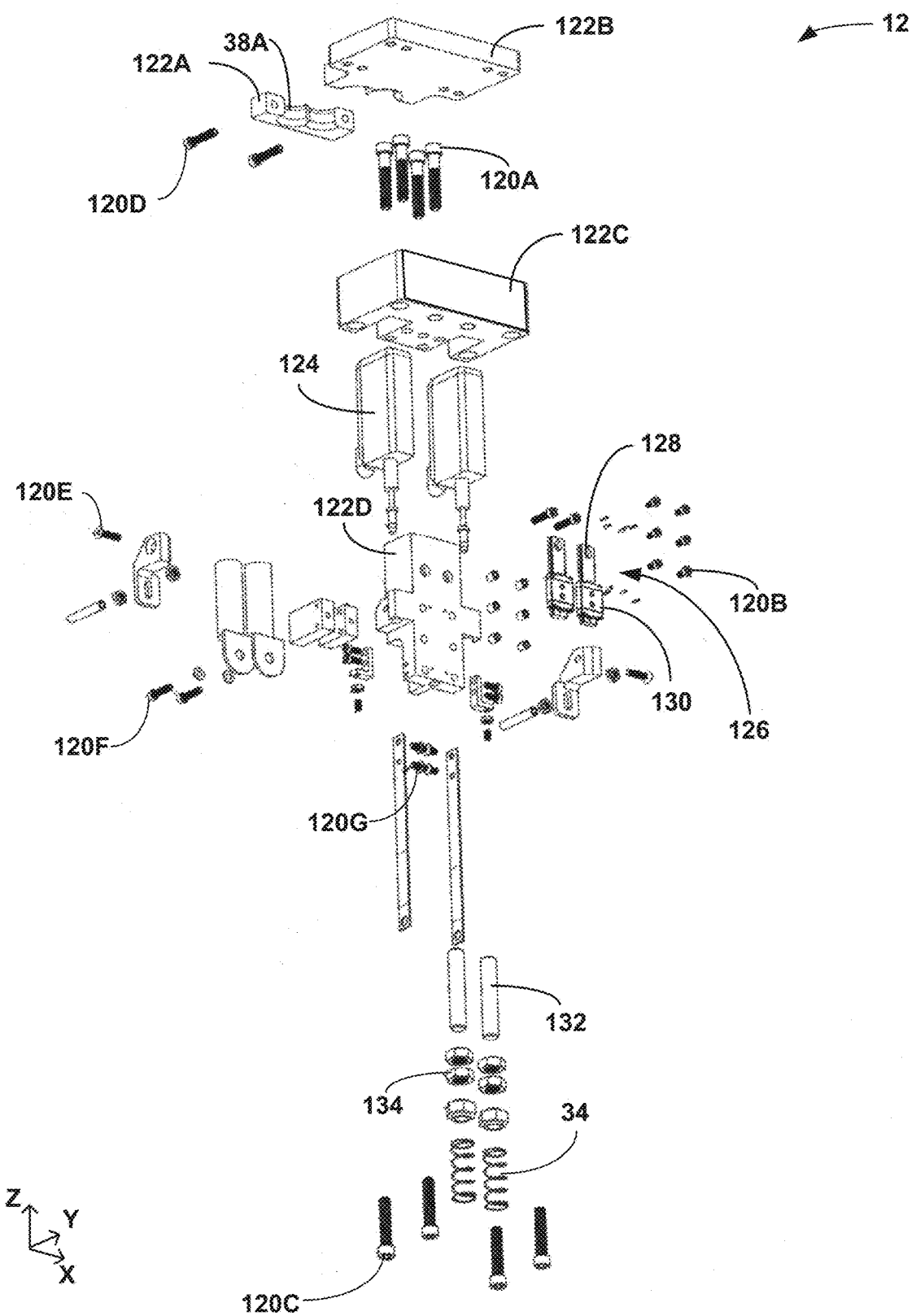
FIG. 6 is an exploded conceptual and schematic view of the weld head of FIG. 1 without either arm of FIG. 1.

FIG. 6. depicts a conceptual and schematic diagram exploded view of weld head 12. Weld arm 12 may include a plurality of securing mechanisms 120A-120G (collectively, "securing mechanism 120") configured to secure weld head 12 in an assembled state. For example, securing mechanisms 120 may include a variety of bolts, dowels, pins, studs, or the like. Securing mechanisms 120 may be configured to removably or reversibly secure weld head 12, such it may be possible to disassemble weld head 12 by removing securing mechanisms 120 without damaging weld head 12 or securing mechanisms 120.

Arm 14 may include a plurality of body components 122A-122D (collectively, "weld head body components 122"). Body components 122 may be cast, machined, or otherwise manufactured into their shape. Body components 102 may be configured to be secured together to hold other components and/or define shapes that may be secured to weld head 12. For example, body components 122C, 122D may be secured together to hold displacement gauge 124 (e.g., for sensing displacement values as discussed herein) in place. Body components may also be secured together to define apertures or bores of weld head 12. For example, body components 122A, 122B may be secured together to define bore 38A as described herein.

Weld head 12 may include sliding components 126 to which arms 14 may be coupled. Sliding components 126 may include a plate 128 that is configured to be fixedly secured to weld head 12 body component 120D using securing mechanisms 120B. Sliding components 126 may also define slide 130 that is configured to slide relative to plate 128. Arms 14 may be configured to be fixedly secured to slide 130 such that arms 14 may move relative to weld head 12. Arms 14 may be fixedly secured to slide 130 using securing mechanisms 100C that extend through apertures 114 of arms 14. As a result of slide 130 and springs 34, arms 14 may be able to move relative to weld head 12, e.g., when respective electrodes 16 contact components 22 to execute a RSW as described herein.

Weld head 12 may include other components that improve an accuracy and robustness of weld system 10. For example, weld head 12 may include pin 132 along which locking nuts 134 may be moved up and down along Z-axis. In some examples, pin 132 may include external threads along a portion of an external surface to facilitate locking nuts 134 moving up and down along Z-axis. As a result of moving locking nuts 134 along Z-axis, a spring tension of spring 34 may be increased or decreased. Altering a spring tension of spring 34 may alter a weld force imparted by electrodes 16 upon components 22 during a weld as described herein.

Figure 7A:
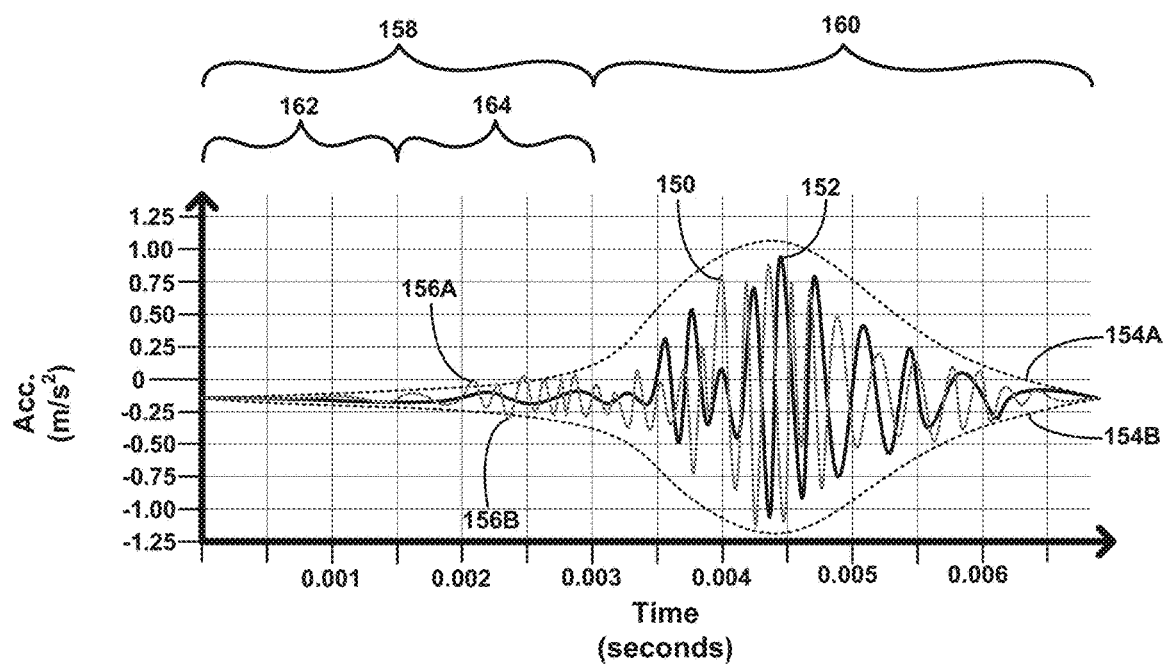
FIGS. 7A and 7B are charts of raw and derivative accelerometer data, respectively, from a successful and defective RSW.

FIG. 7A depicts a charts of acceleration data that indicated a defective weld 150 (said acceleration data hereinafter referred to as "defective acceleration data 150") and acceleration data that indicated a successful weld 152 (said acceleration data hereinafter referred to as "successful acceleration data 152") in comparison to upper and lower threshold ranges 154A, 154B (collectively "threshold range 154"). Defective acceleration data 150 and successful acceleration data 152 may include "raw" acceleration data such that neither first set nor second set of acceleration data 150, 152 have had data manipulated prior to depiction in FIG. 7A. As depicted, threshold range 154 may be different at different times of the respective welds.

As depicted, successful acceleration data 152 may be entirely within upper and lower threshold ranges 154, such that computing device 26 determines that successful acceleration data 152 resulted in a successful weld. Alternatively, defective acceleration data 150 may be include extreme acceleration data points 156A, 156B (collectively "extreme data points 156") that are outside of both upper threshold range 154A and lower threshold range 154B, respectively. Welding system 10 may detect that defective acceleration data 150 includes one or more extreme data points 156 that are outside of upper and lower threshold ranges 154. In some examples, welding system 10 may identify defective acceleration data 150 as indicating a weld defect as a result of only a single extreme data point being outside upper and lower threshold ranges 154. In other examples, welding system 10 may identify defective acceleration data 150 as indicating a weld defect as a result of defective acceleration data 150 having more than a threshold number of extreme data points 156 that are outside of data ranges 154.

In some examples, computer device 26 may identify and isolate certain portions of acceleration data that are relatively prognosticative of welding defects. For example, computing device 26 may identify first portion 158 of acceleration data as prognosticative. First portion 158 of acceleration data may include a portion of acceleration data that includes the first 0.003 seconds of an RSW (e.g., the first 0.003 seconds during which electrodes 16 are creating a circuit by running a current through surfaces 20). For example, in first portion 158, upper and lower threshold ranges 154 may include a relatively narrow band of acceptable ranges, such that successful acceleration data 152 is within upper and lower threshold ranges 154. However, as depicted, defective acceleration data 150 may be outside upper and lower threshold ranges 154 in first portion. In some examples, defective acceleration data 150 may be outside lower and upper threshold range 154 in first portion 158 but within lower and upper threshold range 154 in second portion 160.

In some examples, defective acceleration data 150 may be substantially similar (e.g., statistically similar over a statistically significant amount of RSWs) to successful acceleration data 152 across second portion 160. Put differently, acceleration data may substantially only indicate a defective weld within first portion 158 of acceleration data. Further, in some examples, only a second amount of first portion 158 of weld may be prognostic. For example, initializing portion 162 may include the first 0.0015 seconds of a weld, while prognostic portion 164 of acceleration data may include the time between 0.0015 and 0.003 seconds of a weld. Initializing portion 162 may include substantially nominal acceleration data, such that prognostic portion 164 of acceleration data may be the portion of the data that has the highest correlation with correctly identifying defective welds. Accordingly, in some examples computing device 26 may begin a process of analyzing acceleration data by truncating acceleration data to only include prognostic portion 164.

In other examples the total time of the weld may be different, such that first portion 158 of weld may include a different subset of time. For example, in some instances a full weld may complete in approximately 0.002 seconds. In such examples, first portion 158 may include the first 0.001 seconds of weld, such that second portion 160 includes between 0.001 and 0.002 seconds of weld. Other examples consistent with the disclosure herein are possible in other applications.

Figure 7B:
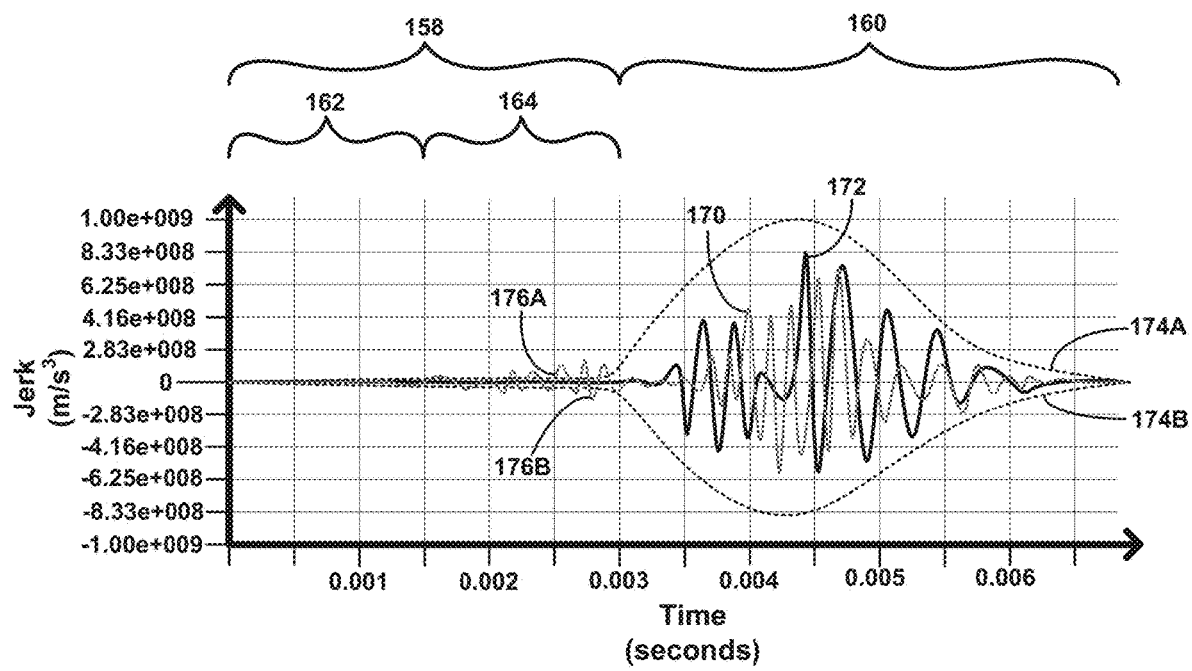

In some examples computing device 26 may execute one or more mathematical operations on acceleration data. Computing device 26 may execute mathematical operations in order to increase an ability of acceleration data to indicate defective welds. For example, computing device 26 may determine a first derivative of the acceleration data to determine the rate of change of the acceleration data (i.e., to determine the jerk of one or more respective electrodes 16). FIG. 7B depicts a chart of such derivative acceleration data of an acceptable and defective weld in comparison to threshold ranges.

FIG. 7B includes defective derived data set 170 and successful derived data set 172. Defective derived data set 170 may include data indicative of a defective RSW. Successful derived data set 172 may include data indicative of a successful RSW. Data points of defective and successful derived data sets 170, 172 are provided for purposes of illustration, such that other data points consistent with the discussion herein may be included in derived data sets are indicative of defective or successful RSWs. FIG. 7B may also include upper threshold range 174A and lower threshold range 174B (collectively, "threshold ranges 174"), as well as first portion 158, second portion 160, initializing portion 162, and prognostic portion 164 of FIG. 7A, which may relate to substantially the same time ranges of FIG. 7A.

As depicted, after a first derivative first portion 158 of second derived data set 172 (e.g., the data set indicative of a successful RSW) may flatten to a substantially flat line. In some examples, derived data sets of successful RSWs may reliably flatten to a substantially flat line, such that upper and lower threshold ranges 174 are relatively close to this predicted flat line. As such, relatively mild deviations from this flat line may be identified as indicative of a defective RSW. For example, first derived data set 170 may include plurality of data points 176A, 176B (collectively "data points 176") outside of upper and lower threshold ranges 174.

In some examples, initial unmodified acceleration data may show a statistically insignificant amount of deviation, but acceleration data following a first derivative may identify a spike that is outside of upper and/or lower threshold ranges 174. In this way, in some examples, computing device 26 may first determine that acceleration data as gathered by accelerometer 24 is within upper and lower threshold ranges 154, after which computing device 26 may determine that derived acceleration data includes some extreme data points 176 outside of upper and/or lower threshold ranges 174. In this way, computing device 26 may be configured to increase an ability of welding system 10 to detect a welding defect.

Figure 8:
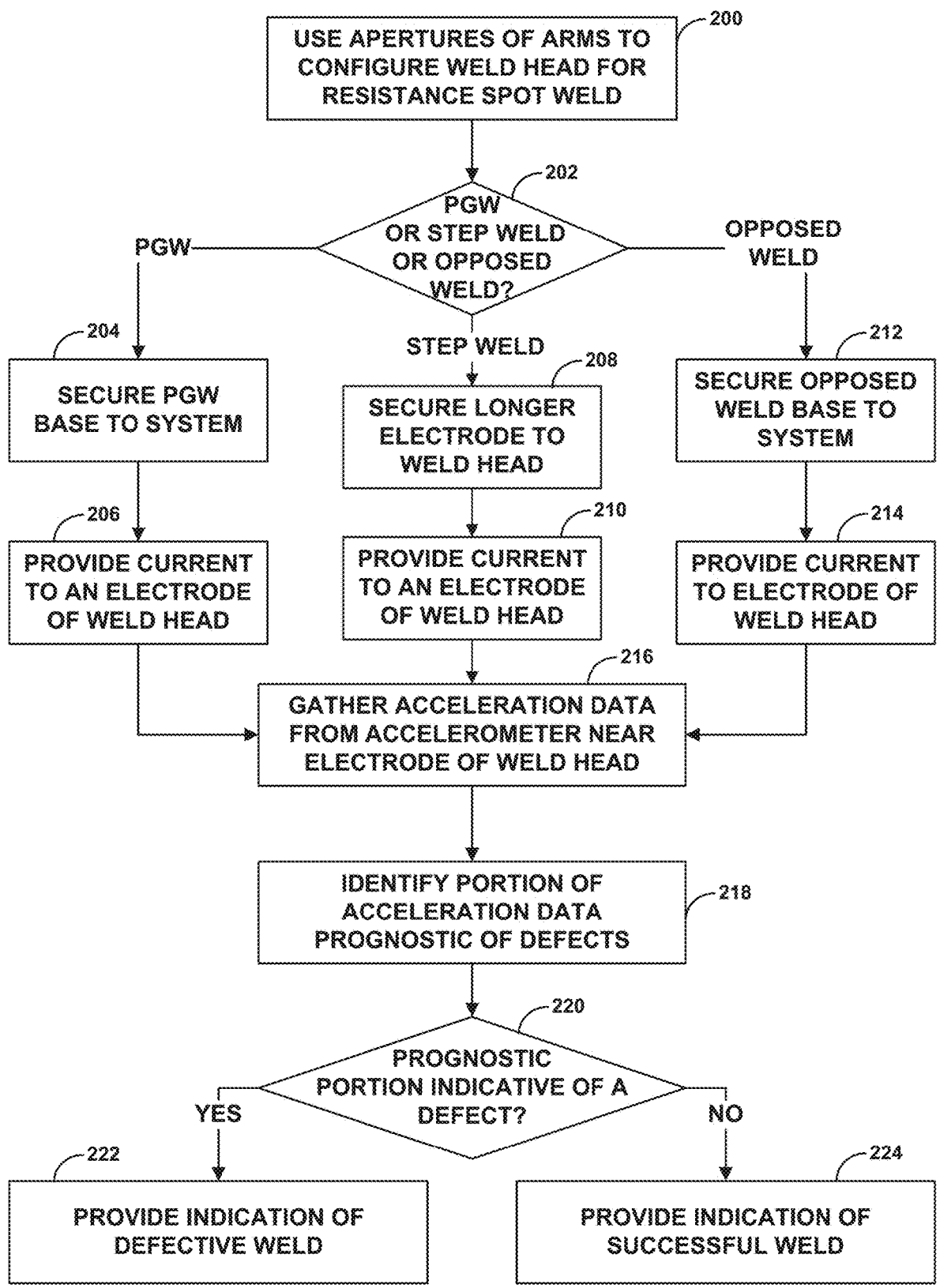
FIG. 8 is a flowchart depicting an example method of monitoring RSWs using the system of FIG. 1.

FIG. 8 depicts a conceptual flowchart of a method of executing and monitoring a weld using the weld system of FIG. 1. Though FIG. 8 is discussed referencing the reference numerals of FIGS. 1-3B, it is to be understood that the method of FIG. 8 may be executed using any weld system consistent with the disclosure herein. Further, in other examples the method of FIG. 8 may be executed with one or more operations in a different order, or may be executed skipping or adding in one or more operations.

Apertures 114 may be used to secure arms 14 to weld head 12 of welding system 10 (200). One or more securing components may be used for each of the one or more apertures 114. For example, a single bolt or pin may be inserted into each of the one or more apertures 114 to secure the arms 14 to weld head 12. Apertures 114 may be selected based on the planned use of welding system 10. For example, securing mechanisms may be inserted into a predetermined plurality of apertures 114 to secure arms 14 at a predetermined relative location to weld head 12 in response to components 20 that welding system 10 will be welding.

Similarly, in some examples an operator may determine a specific electrode 16 for the respective application. For example, an operator may determine a relatively shorter or longer electrode 16 (e.g., electrode 16-1 vs electrode 16-2 vs electrode 16-3 as depicted in FIG. 5) depending upon a particular application. An operator may turn a knob (e.g., knob 108 of FIG. 5) of a respective arm 14 to unsecure a respective electrode 16 and insert an alternate electrode 16. Upon inserting the alternate electrode 16, the operator may turn the knob in the opposite direction to secure the alternate electrode 16 in the respective arm 14.

Welding system 10 may be configured to execute a PGW, a step weld, and/or an opposed weld (202). In some examples, configuring welding system 10 for either PGW or an opposed weld may include no more than switching base 18 of welding system 10, though in other examples switching between PGW and opposed welding may additionally include adding or removing one weld arm 14. For example, welding system 10 may be configured for PGW by securing PGW base 18A to welding system 10 (204). PGW base 18A may not include an electrode. Once PGW base 18A is secure to welding system 10, welding system 10 will provide current to one of electrode 16 of arms 14 (206). For example, computing device 26 may cause current to be routed to one of electrodes 16 of arms 14 through one lead 32. In some examples, the instructions to provide the current may be received using feedback wires (e.g., feedback wires 84 of FIG. 4). System 10 may provide current to an electrode 16A to and let current return through electrode 16B to execute PGW to surfaces 20 below electrodes 16.

Alternatively, where welding system 10 is to execute a step weld, a relatively longer electrode 16 may be secured to one arm 14 of welding system 10 (208). A knob (e.g., knob 108 of FIG. 5) may be unsecured to remove an existing electrode 16 and insert the relatively longer electrode 16. A step weld base 18A which may be substantially similar to a PGW base 18A may be secured to weld system 10. System 12 may then provide current to one electrode 16A of weld head 12 using lead 32 such that current runs through both components 22 and exits through another electrode 16B of weld head 12 back through another respective lead 32 to power source 42 (210). System 12 may provide current to first electrode 16A to create a circuit between power source 42, first electrode 16A, second electrode 16B, and components 22.

Alternatively, where welding system 10 is to execute an opposed weld, opposed base 18B may be secured to welding system 10 (212). Opposed base 18B may include electrode 74 that is configured to align with one electrode 16 of weld head 12 once secured to system. System 12 may then provide current to top electrode 16 using lead 32 such that current runs through both components 22 and exits through electrode 74 of opposed base 18B back through another respective lead 32 to power source 42 (214). System 12 may provide current to top electrode 16 to create a circuit between power source 42, top electrode 16, bottom electrode 74, and components 22.

Accelerometer 24 may gather acceleration data of the weld (216). Accelerometer 24 may gather acceleration data whether or not the weld was an opposed weld, a PGW, or a step weld. In some examples, only one accelerometer 24 may gather acceleration data. For example, where RSW is an opposed weld, accelerometer 24 may be attached to arm 14 that holds electrode 16 that is opposed to electrode 74 of opposed base 18B. In other examples, system 12 may gather acceleration data from two accelerometers (e.g., accelerometers 24A, 24B of FIG. 4). In some examples, computing device 26 may calculate a first derivative of the gathered acceleration data.

Computing device 26 may identify a prognostic portion (e.g., prognostic portion 164 of FIGS. 7A and 7B) of the acceleration data (218). The prognostic portion may include a predetermined time period of the weld. For example, the prognostic portion may include a period of the weld that is subsequent to an initial instantiating portion (e.g., instantiating portion 162 of FIGS. 7A and 7B) and a period of the weld that is prior to the greatest acceleration data points (e.g., second portion 160 of FIGS. 7A and 7B).

Computing device 26 may determine whether the prognostic portion of the acceleration data (220). Computing device 26 may determine that the prognostic portion of the acceleration data is indicative of a welding defective if the prognostic portion of acceleration data includes data points (e.g., data points 156 of FIG. 7A, or data points 176 of FIG. 7B). Accordingly, if computing device 26 determines that the prognostic portion indicates that the weld is defective, computing device 26 may provide an indication of the defective weld (222). For example, computing device 26 may provide a visual indication using display 28, such that a human operator may further inspect or otherwise address components 20 that underwent the respective weld. Additionally, or alternatively, computing device 26 may cause a removal mechanism 30 to remove the components 20 that underwent the weld to a predetermined location for further inspection or disposal.

Alternatively, if computing device 26 determines that the prognostic portion indicates that the weld is successful, computing device 26 may provide an indication of the successful weld (224). For example, computing device 26 may provide the indication to the display 28. Further, in some examples, computing device 26 may store the successful weld in a pseudo-permanent log.

Various examples have been described. These and other examples are within the scope of the following claims.

The invention claimed is:

1. An apparatus comprising:
a resistance spot weld (RSW) head that defines a parallel gap weld (PGW) configuration and an opposed welding configuration, the RSW head comprising:
one or more processing circuits include one or more microprocessors;
a first electrode and a second electrode, wherein the first electrode and the second electrode are in contact with a first set of components on one side, wherein the first electrode and the second electrode are configured to execute a PGW on the first set of components while the first set of components are secured to a base on an opposed side with the first electrode and the second electrode when the RSW head is in the PGW configuration, wherein, alternatively, the first electrode is configured to execute an opposed RSW (opposed weld) on a second set of components with a third electrode embedded within the base, wherein the second set of components are secured between the first electrode and the third electrode when the RSW head is in the opposed welding configuration; and
an accelerometer securely attached to the first electrode at a location adjacent to the first electrode, wherein the one or more processing circuits are configured to cause the accelerometer to gather a PGW set of acceleration data of the first electrode during the PGW and gather an opposed weld set of acceleration data of the first electrode during the opposed weld,
wherein the one or more processing circuits are configured to execute instructions for identifying weld defects stored in a memory so as the one or more processing circuits are configured to:
determine that the PGW set of acceleration data indicates a first weld defect based on the PGW set of acceleration data including at least one acceleration value outside of a first threshold acceleration range, and
wherein the one or more processing circuits are configured to determine that the opposed weld set of acceleration data indicates a second weld defect based on the opposed weld set of acceleration data including at least one acceleration value outside of a second threshold acceleration range.

2. The apparatus of claim 1, wherein both the first threshold acceleration range and the second first threshold acceleration range includes different upper and lower threshold limits for different time periods of RSWs.

3. The apparatus of claim 1, wherein the one or more processing circuits are configured to analyze a first portion of the PGW set and opposed weld set of acceleration data to determine that the PGW set and opposed weld set of acceleration data indicate the first weld defect and the second weld defect, wherein the first portion includes relatively less volatility of acceleration data than a subsequent second portion of the PGW set and opposed weld set of acceleration data.

4. The apparatus of claim 3, wherein the first portion includes a first 0.003 seconds of the PGW set and the opposed weld set of acceleration data.

5. The apparatus of claim 3, wherein the one or more processing circuits are configured to analyze a prognostic portion of the first portion of the PGW set and opposed weld set of acceleration data to determine that the PGW set and opposed weld set of acceleration data indicate the first weld defect and the second weld defect.

6. The apparatus of claim 5, wherein the prognostic portion is between 0.0015 seconds and 0.003 seconds of the PGW set and opposed weld set of acceleration data.

7. The apparatus of claim 1, wherein:
the first electrode and the second electrode are configured to execute another PGW on a third set of components secured to the base when the RSW head is in the PGW configuration;
the one or more processing circuits are configured to cause the accelerometer to gather a third set of acceleration data of the first electrode during the another PGW;

the one or more processing circuits are configured to determine that the third set of acceleration data does not indicate a weld defect by comparing acceleration values of the third set of acceleration data against the first threshold acceleration range;

the one or more processing circuits are configured to determine a first derived set of acceleration data by determining a first derivative of acceleration values of the third set of acceleration data; and the one or more processing circuits are configured to determine that the first derived set of acceleration data indicates a third weld defect by including at least one derived acceleration value outside of a threshold derived acceleration range.

8. The apparatus of claim 1, wherein:

the first electrode is configured to execute another opposed weld with the third electrode of the base on a fourth set of components secured to the base when the RSW head is in the opposed welding configuration;

the one or more processing circuits are configured to cause the accelerometer to gather a fourth set of acceleration data of the first electrode during the another opposed weld;

the one or more processing circuits are configured to determine that the fourth set of acceleration data does not indicate a weld defect by comparing acceleration values of the fourth set of acceleration data against the second threshold acceleration range;

the one or more processing circuits are configured to determine a second derived set of acceleration data by determining a first derivative of acceleration values of the fourth set of acceleration data; and the one or more processing circuits are configured to determine that the second derived set of acceleration data indicates a fourth weld defect by including at least one derived acceleration value outside of a threshold derived acceleration range.

9. The apparatus of claim 1, wherein the RSW head is configured to execute the PGW by moving both the first electrode and the second electrode toward the base and wherein the RSW head is configured to execute the opposed weld by moving the first electrode toward the base.

10. The apparatus of claim 1, further comprising a first arm that is configured to receive the first electrode and a second arm that is configured to receive the second electrode, wherein the first arm and the second arm are fixedly connected secured to the RSW head by a set of securing mechanisms that extend through apertures of the first arm and the second arm and extend into apertures of the RSW head.

11. The apparatus of claim 1, wherein the first electrode and the second electrode define a cross-sectional area of approximately 1.015 millimeters by 0.635 millimeters at a tip that is configured to contact the first and second set of components.

12. The apparatus of claim 1, the RSW head including a removal mechanism, wherein:

the one or more processing circuits are configured to cause the removal mechanism to physically remove the first set of components from the base to a predetermined defect location based on the one or more processing circuits determining that the PGW set of acceleration data indicates the first weld defect; and the one or more processing circuits are configured to cause the removal mechanism to physically remove the second set of components from the base to the predetermined defect location based on the one or more processing circuits determining that the opposed weld set of acceleration data indicates the second weld defect.

13. The apparatus of claim 1, further comprising a display, wherein:

the one or more processing circuits are configured to cause the display to provide an indication of the first weld defect based on the one or more processing circuits determining that the PGW set of acceleration data indicates the first weld defect; and the one or more processing circuits are configured to cause the display to provide an indication of the second weld defect based on the one or more processing circuits determining that the opposed weld set of acceleration data indicates the second weld defect.

14. The apparatus of claim 1, wherein the accelerometer is mounted to the first electrode at the location adjacent to the first electrode using one or more magnets.

15. The apparatus of claim 1, wherein the RSW head defines a step welding configuration and further comprises a third electrode that is interchangeable with the second electrode and is relatively longer than the second electrode, wherein the first electrode and the third electrode are configured to execute a step RSW (step weld) on a third set of components secured to the base when the RSW head is in the step welding configuration, wherein the one or more processing circuits are configured to cause the accelerometer to gather a step weld set of acceleration data of the first electrode during the step weld, wherein the one or more processing circuits are configured to determine that the step weld set of acceleration data indicates a third weld defect based on the step weld set of acceleration data including at least one acceleration value outside of a third threshold acceleration range.

16. A welding system comprising:

a computing device that comprises:
one or more processing circuits including one or more microprocessors; and
a display, a resistance spot weld (RSW) head that defines a PGW configuration and an opposed welding configuration, the RSW head comprising:
a first arm that is configured to receive a first electrode;
a second arm that is configured to receive a second electrode, wherein the first electrode and the second electrode are in contact with a first set of components on one side; and
an accelerometer securely attached to the first electrode at a location adjacent to the first electrode;

a first base with a first securing platform configured to secure first set of components; and a second base with a second securing platform configured to secure a second set of components and including a third electrode for opposed RSW (opposed weld), wherein the first electrode and the second electrode are configured to execute a parallel gap RSW (PGW) on the first set of components as secured to the first base when the RSW head is in the PGW configuration, wherein the first electrode and the third electrode are configured to execute an opposed weld on the second set of components as secured to the second base when the RSW head is in the opposed welding configuration, wherein the one or more processing circuits are configured to cause the accelerometer to gather a PGW set of acceleration data of the first electrode during the PGW and gather an opposed weld set of acceleration data of the first electrode during the opposed weld, wherein the one or more processing circuits are configured to execute instructions of identifying weld defects stored in a memory so as the one or more processing circuits are configured to indicate a first weld defect of the first set of components on the display based on determining that a first portion of the PGW set of acceleration data indicates the first weld defect by including at least one acceleration value outside of a threshold acceleration range, wherein the first portion includes relatively less volatility of acceleration data than a subsequent second portion of the PGW set of acceleration data, and wherein the one or more processing circuits are configured to indicate a second weld defect of the second set of components on the display based on determining that a first portion of the opposed weld set of acceleration data indicates the second weld defect by including at least one acceleration value outside of the threshold acceleration range, wherein the first portion of the opposed weld set of acceleration data includes relatively less volatility of acceleration data than a subsequent second portion of the opposed weld set of acceleration data.

17. The welding system of claim 16, wherein the first portion of the PGW set of acceleration data includes a first 0.001 seconds of the PGW and the first portion of the opposed weld set of acceleration data includes a first 0.001 seconds of the opposed weld.

18. The welding of claim 16, wherein the one or more processing circuits are configured to analyze a prognostic portion of the first portion of the PGW set and opposed weld set of acceleration data to determine that the first and opposed weld set of acceleration data indicate the first and the second weld defect.

19. The welding of claim 16, wherein the prognostic portion is between 0.0005 seconds and 0.001 seconds of the PGW of the PGW set of acceleration data and between 0.0005 seconds and 0.001 seconds of the opposed weld of the opposed weld set of acceleration data.

20. The welding system of claim 16, wherein:
the first electrode and the second electrode are configured to execute another PGW on a third set of components secured to the first base when the RSW head is in the PGW configuration;
the one or more processing circuits are configured to cause the accelerometer to gather a third set of acceleration data of the first electrode during the another PGW;
the one or more processing circuits are configured to determine that the third set of acceleration data does not indicate a weld defect by comparing acceleration values of the third set of acceleration data against the threshold acceleration range;
the one or more processing circuits are configured to determine a first derived set of acceleration data by determining a first derivative of acceleration values of the third set of acceleration data; and
the one or more processing circuits are configured to determine that the first derived set of acceleration data indicates a third weld defect by including at least one derived acceleration value outside of a threshold derived acceleration range.

21. The welding system of claim 16, wherein:
the first electrode is configured to execute another opposed weld with the third electrode of the second base on a fourth set of components secured to the second base when the RSW head is in the opposed welding configuration;
the one or more processing circuits are configured to cause the accelerometer to gather a fourth set of acceleration data of the first electrode during the another opposed weld;
the one or more processing circuits are configured to determine that the fourth set of acceleration data does not indicate a weld defect by comparing acceleration values of the fourth set of acceleration data against the threshold acceleration range;
the one or more processing circuits are configured to determine a second derived set of acceleration data by determining a first derivative of acceleration values of the fourth set of acceleration data; and
the one or more processing circuits are configured to determine that the second derived set of acceleration data indicates a fourth weld defect by including at least one derived acceleration value outside of a threshold derived acceleration range.

22. The welding system of claim 16, wherein the RSW head is configured to execute the PGW by being moved toward the first base and enabling both the first arm receiving the first electrode and the second arm receiving the second electrode to move relative to the RSW head during the PGW and wherein the RSW head is configured to execute the opposed weld by moving the RSW head toward the second base and enabling the first arm receiving the first electrode to move relative to the RSW head during the opposed weld.

23. A method of welding comprising:
executing a parallel gap resistance spot weld (RSW) to a first set of components secured to a first base with a welding system that includes one or more processing circuits including one or more microprocessors configured to execute instructions for identifying weld defects stored in a memory and a weld head and a first and second electrode secured to the weld head by providing current to the first electrode and enabling the current to exit through the second electrode when the first and second electrodes are contacting the first set of components, wherein the first electrode and the second electrode are in contact with the first set of components on one side;
gathering, by an accelerometer secured to the weld head, a PGW set of acceleration data of the first electrode during the period of time during which the first electrode provided current to the first set of components;
determining, by the one or more processing circuits according to the instructions, that the PGW set of acceleration data indicates a first weld defect by identifying that the PGW set of acceleration data includes at least one acceleration value outside of a first threshold acceleration range;
executing, with the welding system, an opposed RSW (opposed weld) to a second set of components secured to a second base that includes a third electrode, the opposed weld executed by providing current to the first electrode and enabling the current to exit through the third electrode when the first electrode and the third electrode are contacting the second set of components;
gathering, by the accelerometer, an opposed weld set of acceleration data of the first electrode during the period of time during which the first electrode provided current to the second set of components; and determining, by the one or more processing circuits according to the instructions, that the opposed weld set of acceleration data indicates a second weld defect by identifying that the opposed weld set of acceleration data includes at least one acceleration value outside of a second threshold acceleration range.

24. The method of claim 23, wherein both the first threshold acceleration range and the second threshold acceleration range include different upper and lower threshold limits for different time periods of RSWs.

25. The method of claim 23, wherein the one or more processing circuits are configured to analyze a first portion of the PGW set and opposed weld set of acceleration data to determine that the PGW set and opposed weld set of acceleration data indicate the first weld defect and the second weld defect, wherein the first portion includes relatively less volatility of acceleration data than a subsequent second portion of the PGW set and opposed weld set of acceleration data.

26. The method of claim 25, wherein the first portion includes a first 0.003 seconds of the PGW set and the opposed weld set of acceleration data.

27. The method of claim 25, wherein the one or more processing circuits are configured to analyze a prognostic portion of the first portion of the PGW set and opposed weld set of acceleration data to determine that the PGW set and opposed weld set of acceleration data indicate the first weld defect and the second weld defect.

28. The method of claim 27, wherein the prognostic portion is between 0.0015 seconds and 0.003 seconds of the PGW set and opposed weld set of acceleration data.

* * * * *